Dec. 15, 1970     M. G. TOGNERI     3,548,169
PROCESS CONTROLLING DIGITAL TO ANALOG CONVERTER
Filed March 14, 1967     2 Sheets-Sheet 1
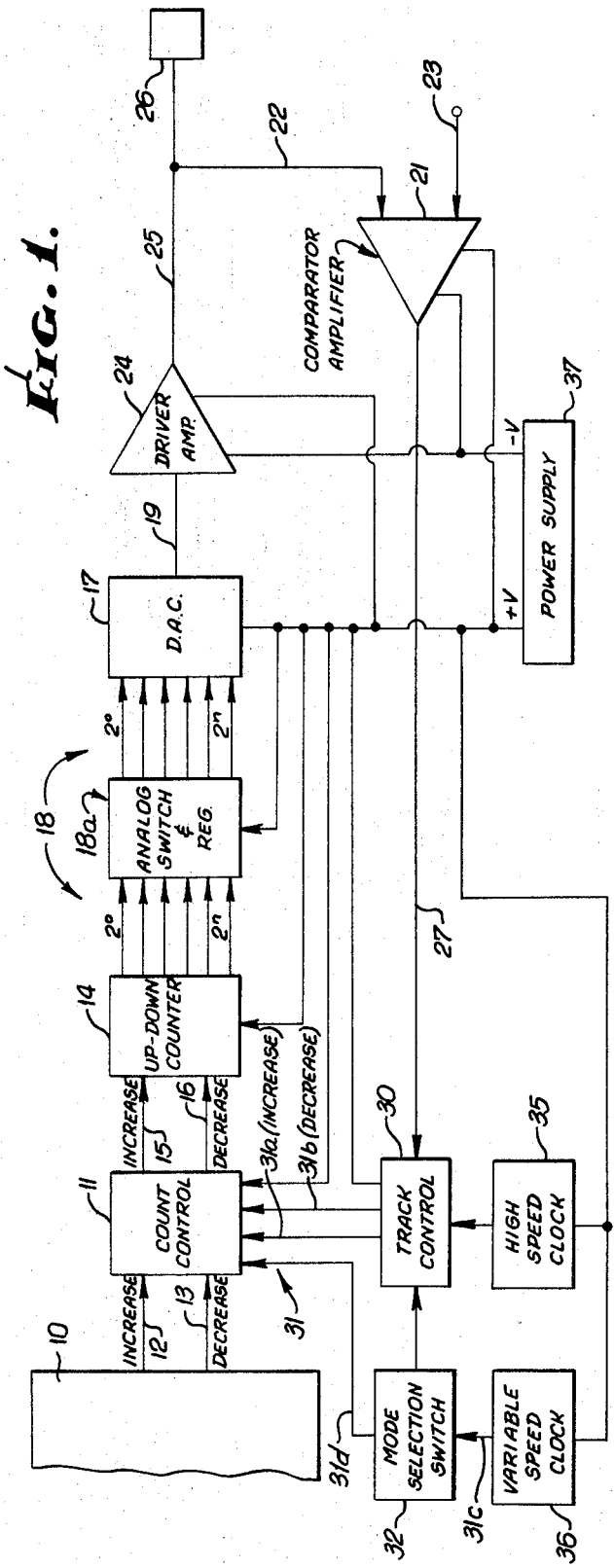
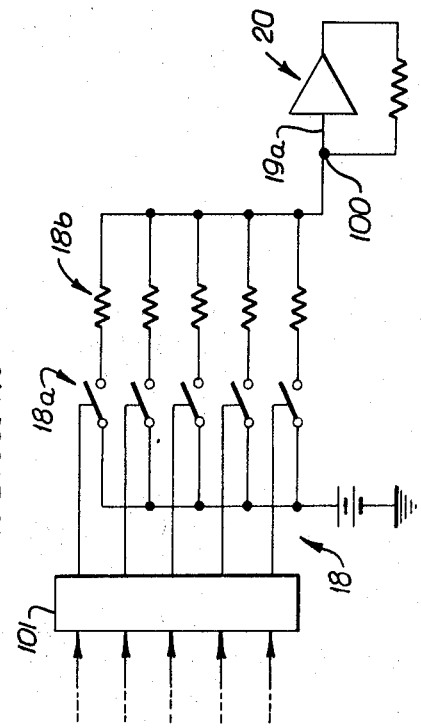
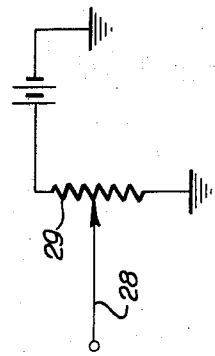
INVENTOR.
MAURO G. TOGNERI
By White & Haefliger
ATTORNEYS.

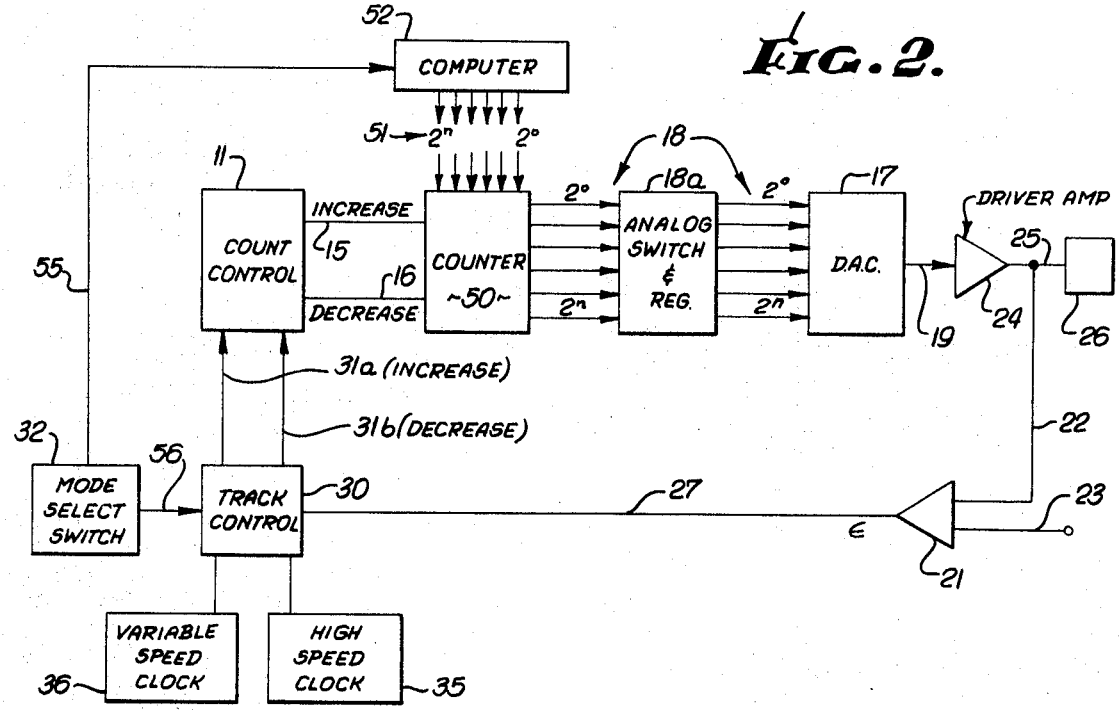
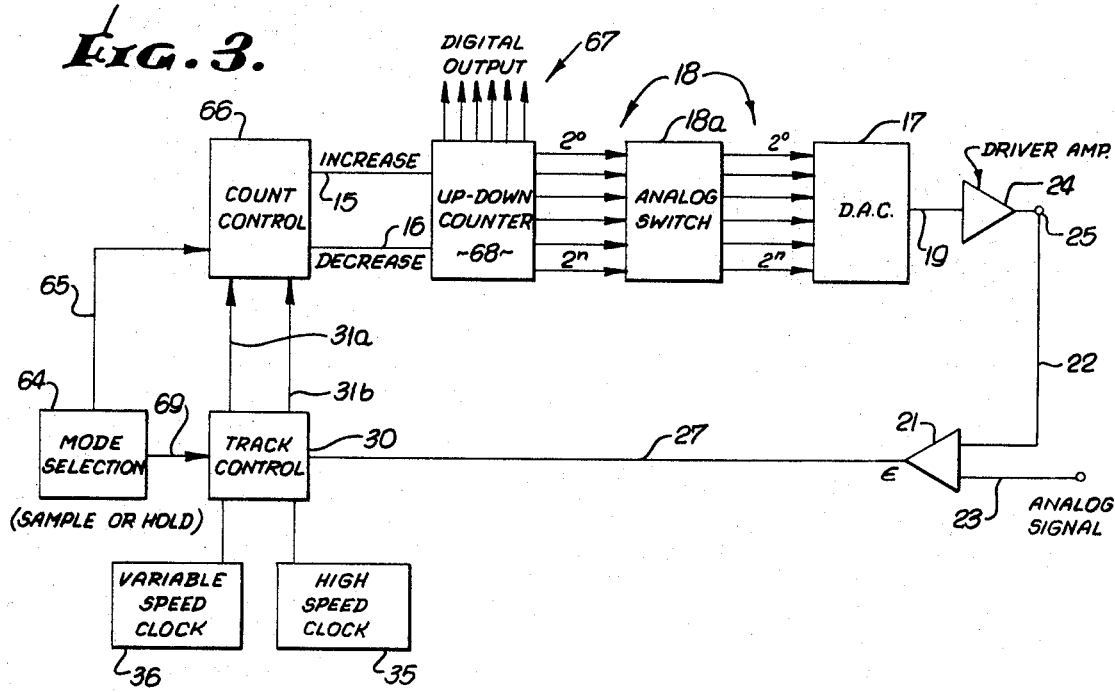

United States Patent Office 3,548,169
Patented Dec. 15, 1970

3,548,169
PROCESS CONTROLLING DIGITAL TO
ANALOG CONVERTER
Mauro G. Togneri, Houston, Tex., assignor to The Fluor
Corporation, Ltd., Los Angeles, Calif., a corporation of
California
Filed Mar. 14, 1967, Ser. No. 623,015
Int. Cl. H03k 21/34
U.S. Cl. 235—92                                7 Claims

ABSTRACT OF THE DISCLOSURE

The invention concerns a computer output controlled process controller embodying an up-down counter, a digital to analog converter responsive to counter digital output, a comparator responsive to converter analog output and to a variable external analog input signal to produce an error signal, and control apparatus including switch and clock means to change the count in the counter selectively in response to change in computer output, or in response to the error signal, to reduce the latter.

BACKGROUND OF THE INVENTION

This invention relates generally to computer control of processes, and more particularly concerns provision for alternate manual control of a digital computer controlled process without loss of system stability.

Generally speaking, it is desirable in process control that input digital information be provided, as from computer memory or other sources, for conversion to analog outputs for use in controlling a process variable. For example, a flow valve may be automatically controlled in this manner, or in the case of a supervisory computer a set point can in this manner be provided to a standard analog controller. On the other hand, it is frequently desirable that the process variable alternately be controllable from another source, as for example manually in the event that the operator wishes to assume control of a flow valve from the computer, or to supply an arbitrary set point to the analog controller. Such operator assumption of control tends to produce undesirably sudden disturbance of system as well as process stability due to disconnection of computer control and connection of manual control, and which is difficult to correct or anticipate.

SUMMARY OF THE INVENTION

The present invention has as its major object the provision of a desirably effective solution to the instability problem referred to. While other attempts may have been made in this direction, none of these have to my knowledge possessed the unique and unusually effective advantages in construction, mode of operation and results afforded by the present invention. Basically, the latter contemplates the provision in a computer output controlled process controlled of an up-down counter having digital output, a digital to analog converter connected to be responsive to counter digital output to produce an analog signal corresponding to the count in the counter, a comparator connected to be responsive to a version of the analog signal and to a selectively variable external analog input to produce an error signal corresponding to the difference therebetween, and control apparatus including switch and clock means connected to change the count in the counter selectively in response to change in the computer output, or in response to the error signal, to reduce the latter.

More specifically, the controller may typically include a driver amplifier connected to be responsive to the analog signal to produce a process controlling analog output defining the referred to "version" of the analog signal. Also, the control apparatus may include a count control having increase and decrease connection to the counter input, and a track control responsive to the error signal and to the clock means output to feed clock pulses to the count control to be delivered to the counter via the increase connection when the count is to be increased to reduce the error signal, and via the decrease connection when the count is to be decreased to reduce the error signal.

In another form of the invention, the switch means has alternate positions corresponding to computer control and error signal control, and the counter has direct parallel digital input from the computer output when the switch means has computer output position.

In still another form of the invention, the control apparatus includes clock means and sample and hold mode switching means connected to control the count in the counter selectively to correspond to the analog input when the switching means is in sample mode and to remain constant when the switching means is in hold mode.

These and other objects and advantages of the invention, as well as the details of illustrative embodiments, will be more fully understood from the following detailed description of the drawings, in which:

BRIEF DESCRIPTION OF THE DRAWINGS

FIG. 1 is a block diagram showing a computer output controlled process controller incorporating the invention;

FIG. 1a is a circuit diagram showing one form of digital to analog converter usable in the FIG. 1 diagram;

FIG. 1b is a circuit diagram showing development of external analog voltage;

FIG. 2 is a block diagram showing a modified process controller incorporating the invention;

FIG. 3 is a block diagram showing another modified process controller incorporating the invention.

DESCRIPTION OF PREFERRED EMBODIMENTS

Referring first to FIG. 1, interface connections between a digital computer 10 and a count control 11 are represented as count increase and decrease levels 12 and 13. A bi-directional or up-down counter 14 has connections 15 and 16 with the control 11 such that signal on connection 15 causes the counter to count up, and signal on connection 16 causes the counter to count down.

A digital to analog converter 17 is connected at 18 to be responsive to counter digital output to produce an analog signal at 19 corresponding to the count in the counter. Connection 18 is represented by the parallel binary input channels $2^0 \ldots 2^n$ shown, and the analog switch means 18a. Typically, the converter 17 and connections 18 may include a binary register incorporating flip-flops connected to be driven by the counter, the flip-flops controlling switches in a voltage divider network. Merely for purposes of illustration, FIG. 1a shows a usable convention digital to analog converter, or DAC, as inclusive of an operation amplifier 20 to the input of which parallel resistors 18b are connected via suitable switches 18a, the values of the resistors selected to produce current summing at junction 100, for deriving the corresponding analog output at point 19a. The switch arms are controlled by flip-flops in a binary register 101 driven by the counter 14.

A comparator 21 is connected to be responsive to a version of the analog signal and to a selectively variable external analog input to produce an error signal at 27 corresponding to the difference therebetween. For example, a version of the analog signal may be fed on lead 22 to the comparator input, and the external analog signal may be fed on lead 23 to the comparator input. In this regard, a driver amplifier 24 may be connected as shown to respond to the analog signal at 19 to produce the process controlling analog output at 25 and also defining the mentioned "version" of the analog signal appearing on lead 22. A process variable such as a flow valve is represented at 26 as controlled by the signal at 25. The external analog signal on lead 23 may for example be generated as seen in FIG. 1b, wherein a wiper 28 picks off variable voltages on resistor 29 to which a source of potential is connected.

Further in accordance with the invention, control apparatus including switch and clock means is connected to change the count in the counter selectively in response to change in the computer output, or in response to the error signal appearing at 27, so as to reduce the error signal. In this regard, the count control 11 previously described may be considered as part of such control apparatus. The latter may also typically include a track control 30 responsive to the error signal (as by connection with lead 27) and to the output of the clock means, to feed clock pulses at 31 to the count control to be delivered to the counter 14. Such delivery is via the increase connections 31a and 15 when the count in the counter is to be increased to reduce the error signal, and via the decrease connections 31b and 16 when the count in the counter is to be decreased to reduce the error signal. In this regard, a mode selection switch at 32 controls the track control 30 and the count control 11 so that clock pulses are fed at 31 when the system is to operate in track mode, and so that clock pulses are not fed at 31 when the system is to operate in computer control mode only. The analog voltage at 25 is "stored" in the servo loop in the sense that an error signal is always present on lead 27 when a difference exists between the comparator inputs at 21 and 23, so that when switch 32 is switched to track mode the analog output at 25 will smoothly change to the value selected by the manual input setting. Computer control is disabled by switch 32 when track mode control is enabled by switch 32, and vice versa.

Further, the polarity of the error signal may be used in such manner for example that when the error signal is positive, pulses from high speed clock 35 are fed to the increase line 15, and when the error signal is negative, pulses from clock 35 are fed to the decrease line 15. A variable speed clock 36 is suitably adjustable in order to vary loop response for maximum stability, the output of clock 36 being supplied for computer control, via the mode selector, for application at 31c to the count control 11. The count control 11 functions together with the track control to perform the above functions. A power supply is indicated at 37 as having suitable connections with the various elements of the system.

In a version similar to FIG. 1, the computer instead of increasing or decreasing the count by closing the proper switch and routing the variable speed clock pulses to the counter through the count control, will directly supply a train of pulses to the counter.

Referring now to FIG. 2, the block diagram illustrated is the same as in FIG. 1, with the exception that the counter 50 has direct parallel digital input at 51 from the computer 52, for changing the count in the counter, instead of serial input from the computer 10 as in FIG. 1. The latter condition exists when the mode selection switch 32 is in computer control position. When the switch 32 is in track mode, or position, computer input to the counter is disabled via a signal on lead 55, and the counter is made responsive to clock inputs as a result of being enabled by a signal on lead 56. The count in the counter increases or decreases in order to drive the error signal toward zero.

Finally, reference is made to FIG. 3, wherein the construction is the same as in FIG. 1 excepting that the control apparatus differs somewhat. As to the latter, it is responsive to the error signal and includes clock means and sample and hold mode switching means connected to control the count in the counter selectively to correspond to the analog input when the switching means is in sample mode, and to remain constant when the switching means is in hold mode.

In this regard, the sample and hold switching means is shown at 64 as connected at 65 with the count control 66 and with the track control at 69. The output in this case is a parallel set of binary coded digital bits taken direct from the counter stages indicated at 67. In the sample mode of operation, the device operates in the same manner as when in the track mode of FIGS. 1 and 2. When in the hold mode, the counter 68 is prevented from increasing or decreasing its count regardless of the analog input value on lead 23.

Commercially available components usable in the described apparatus are identified as follows:

| Element: | Commercial item |
|---|---|
| 11 | Fairchild integrated circuits (logic elements). |
| 14 | Fairchild integrated circuits (logic elements). |
| 17 | Texas Inst. Transistors and Resistors. |
| 24 | Nexus SQ10a amplifier. |
| 21 | Nexus SQ10a amplifier. |
| 30 | Fairchild integrated circuit (logic elements). |
| 50 | Fairchild integrated circuit (logic elements). |
| 68 | Fairchild integrated circuit (logic elements). |

I claim:
1. In a computer output controlled process controller:
a counter having a digital output,
a digital to analog converter connected to be responsive to counter digital output to produce an analog signal corresponding to the count in the counter,
a comparator connected to be responsive to a version of said analog signal and to a selectively variable external analog input to produce an error signal corresponding to the difference therebetween,
an output terminal electrically connected with said converter to transmit said version of said analog signal independently of the comparator for controlling a utilization device,
and control apparatus including a clock and count control means having input connections to selectively receive output pulses from the computer and from the clock for transmission to the counter, said apparatus including a track control responsive to said error signal to control clock pulse transmission to the count control means, there also being mode control switch means for controlling pulse transmission to the counter via the count control means and having one position in which the computer output but not the clock output is fed to the counter, and another position in which the clock output but not the computer output is fed to the counter via the count control.

2. A controller as defined in claim 1 including a driver amplifier connected to be responsive to said analog signal to produce a process controlling analog output defining said version of said analog signal.

3. A controller as defined in claim 1 wherein said count control means has increase and decrease connections to the counter input, said track control being responsive to said error signal and to the clock output to feed clock pulses to the count control means to be delivered to the counter via said increase connection when said count is to be increased to reduce the error signal, and via said decrease connection when said count is to be decreased to reduce said error signal.

4. The controller as defined in claim 3 including said computer having pulse train output connection to the count control means.

5. A controller as defined in claim 1 wherein said counter has direct parallel digital input from the computer output when said switch means has said one position.

6. The controller as defined in claim 1 wherein said counter is an up-down counter adapted to count up in response to production of an error signal of one polarity, and to count down in response to production of an error signal of opposite polarity.

7. The controller as defined in claim 1 including said utilization device to which said converter is electrically connected via said output terminal, the comparator being outside the connection between the converter and said device.

References Cited
UNITED STATES PATENTS

| | | | |
|---|---|---|---|
| 3,438,024 | 4/1969 | Smith | 340—347 |
| 3,391,275 | 7/1968 | Bullock | 235—151.1 |
| 3,062,442 | 11/1962 | Boensel | 235—92 |
| 3,059,228 | 10/1962 | Beck | 340—179 |

MAYNARD R. WILBUR, Primary Examiner

R. F. GNUSE, Assistant Examiner

U.S. Cl. X.R.

235—151.1; 340—347